July 9, 1957 R. PAPPENS ET AL 2,798,336
GLASS DRAWING APPARATUS
Filed Feb. 24, 1953 2 Sheets-Sheet 1

INVENTORS
RENE PAPPENS
JEAN PAUL SCHRADER
BY
Bauer E Seymour
ATTORNEYS

July 9, 1957 R. PAPPENS ET AL 2,798,336
GLASS DRAWING APPARATUS
Filed Feb. 24, 1953 2 Sheets-Sheet 2
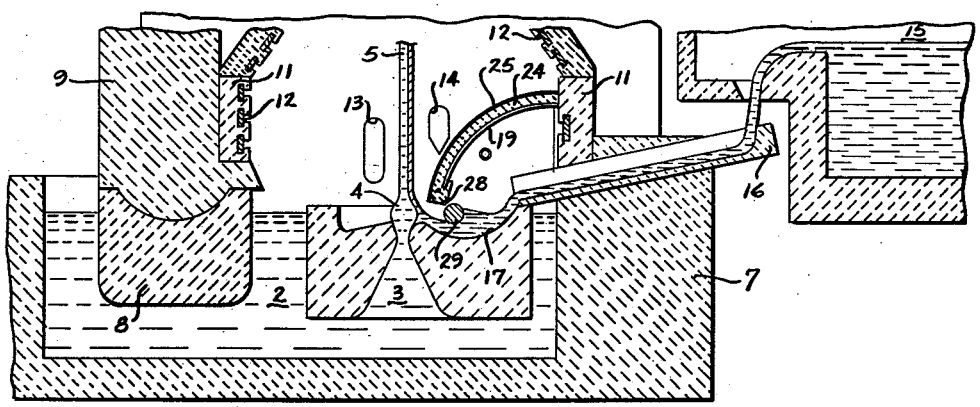
FIG.3
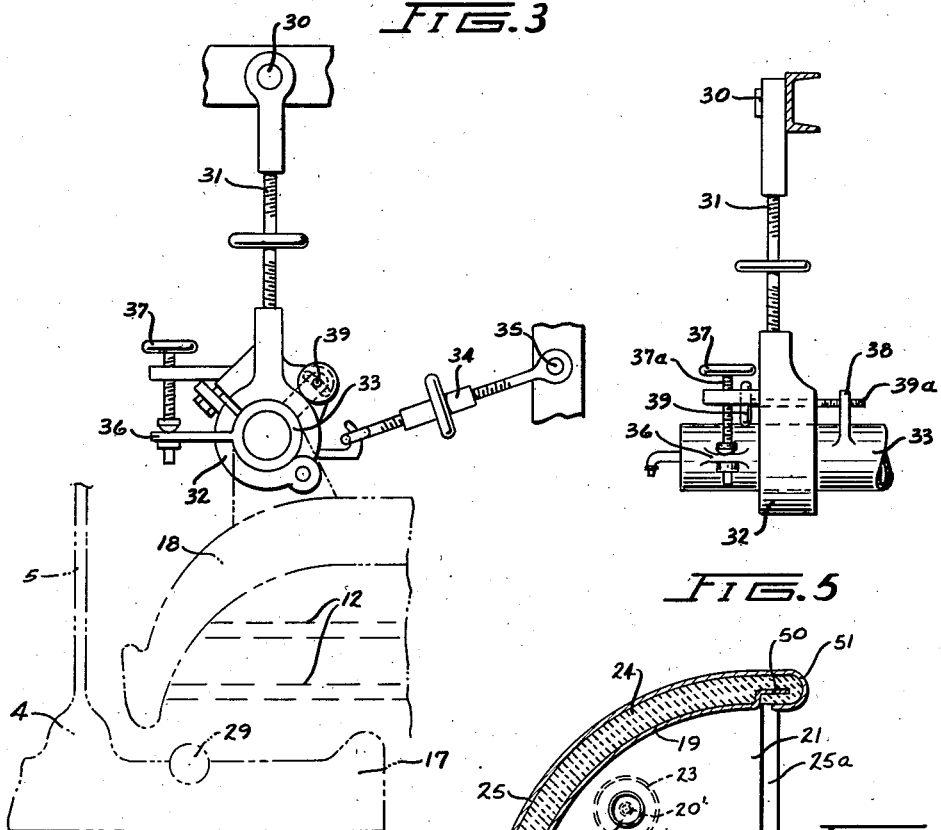
FIG.5
FIG.4
FIG.6
INVENTORS
RENE PAPPENS
JEAN PAUL SCHRADER
BY
ATTORNEYS

United States Patent Office 2,798,336
Patented July 9, 1957

2,798,336

GLASS DRAWING APPARATUS

René Pappens, Paris, France, and Jean Paul Schrader, Lamiaco by Bilbao, Spain, assignors to Societe Anonyme des Manufactures des Glaces et Produits Chimiques de Saint-Gobain, Chauny & Cirey, Paris, France Application February 24, 1953, Serial No. 338,457

Claims priority, application France February 23, 1952

21 Claims. (Cl. 49—3)

Our present invention concerns the manufacture of glass articles, such as sheets, tubes, rods and the like by continuous drawing. It applies, more specially when those articles are to be coated, partially or wholly, with a layer of coloured, transparent or opaque glass or enamel while they are being drawn up.

The object of our invention is an apparatus which enables to heat some parts of the drawing chamber, or some articles contained therein, to a temperature above the general temperature of said chamber without appreciably modifying this general temperature or disturbing the manufacture of said articles.

The apparatus according to the invention principally consists in a radiant heating member which is constructed to direct a heat flux towards the part of the article to be heated, combined with a screen which stops the thermic radiation in any direction except that to which said heating is desired.

This apparatus may include a flat, or suitably curved, electrically conductive plate, heated by an electric current, which has its reverse surface, that surface opposite to the one which is directed toward the heated zone, covered with a screen. Said screen may be completely heat insulated, or it may have a part of its outer surface provided with a casing through which a cooling fluid is circulated if it is desired to heat one part of the drawing chamber and, at the same time, to cool an adjoining part.

In an apparatus constructed according to the invention, the heating member, instead of being a conductive plate, may comprise a plurality of conductive strips connected by their ends to a frame, the number and arrangement of these strips enabling to control the intensity and distribution of heating.

When glass sheets are drawn up by the Fourcault process, our invention can be applied to heat the upper surface of the drawing float or the surface of the glass bath on both sides of said sheet, thus preventing or, at least, delaying the beginning of devitrification, which is a well-known drawback of such process and which is caused by a protracted stagnation of the glass at a temperature which promotes devitrification.

Our invention is also very advantageous in the manufacture of Fourcault drawn glass when this glass is coated with colored or white enamel coating.

It is known that a process of this kind consists in providing on the upper surface of the drawing float, either on one side, or on both sides of its slot, according as the enamel should be deposited on one side only, or on both sides of the glass sheet, a cavity which is parallel to said slot and contains an enamel which moistens the base of the sheet and is drawn up together with it. In such case, the apparatus according to our invention has for its object the control of the temperature of the enamel, which depends on its composition and colour; said control should be exerted without the heat emitted by it appreciably modifying the temperature of the drawing chamber and becoming harmful to a good drawing.

As an example of our invention, we will describe an apparatus for continuously drawing a composite glass sheet, in reference to the accompanying drawings.

Figure 3 is a schematic illustration of another form of the screen;

Figure 2:
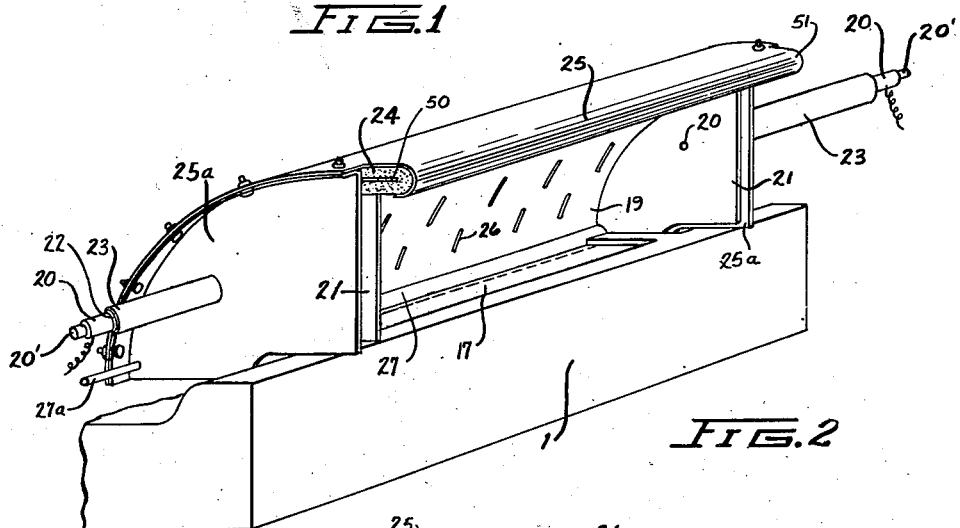
Figure 2 is a perspective view at an enlarged scale, of the screen of the device shown in Figure 3.
Figure 7:
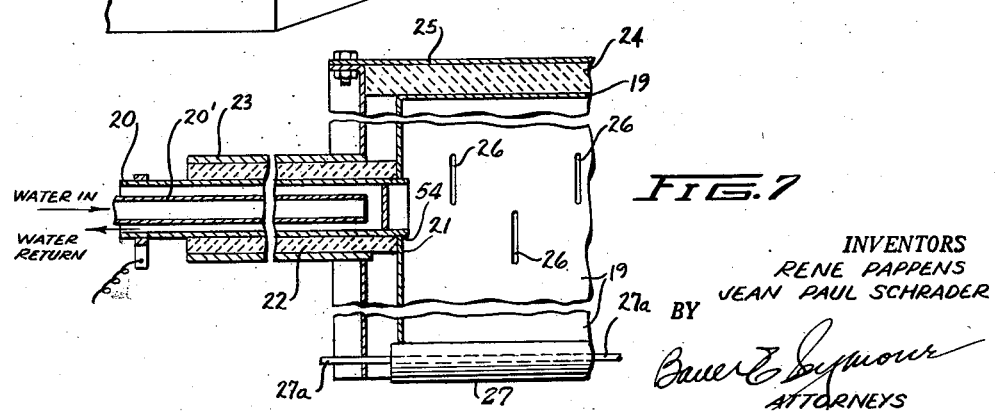

Figures 4 and 5 respectively represent a side view and a front view of the supporting and regulating members of the screen shown in Fig. 3;

Fig. 6 is a vertical section through Fig. 2, taken midway between the sides of plate 19, showing the construction of the shield;

Fig. 7 is a detail showing the method of connecting the plate 19 to a source of electrical supply.

The drawing float 1, placed in the glass bath 2, is provided with the usual slot 3 through which the glass rises under the effect of the hydrostatic pressure of the surrounding glass while forming a bulb 4 which gives rise to the glass sheet 5 in a known way under the effect of the pull exerted by means not shown which are located out of the figure. The glass sheet 5 rises in a glass drawing chamber 6 which is delimited by the wall 7, the weir 8, the blocks 9, 10 and refractory pieces 11 provided with grooves 12 containing electrical resistances which raise the compartment to and maintain it at a suitable temperature. The usual cooling members 13 and 14, traversed by a flow of water, are intended to rapidly solidify the root of the sheet as soon as the bulb has been drawn to the desired thickness. The enamel 60 flows by gravity from a melting furnace 15 into a spout 16 as a thin stream which fills the longitudinal trough or basin 17 which is disposed in the upper part of the drawing float 1 parallel to the sheet 5. The heating device 18, according to our invention is erected above said drawing float 1 and its details are shown in Figure 2. Said heating device comprises a vaulted metal plate 19 through which passes an electrical current brought in by the tubes 20 connected to the side plates 21 which are welded to the plate 19. These tubes are cooled by a water flow and electrically insulated by an insulating sheath 22, other outer tubes 23 are used for supporting the device and putting it in its place.

The heating plate 19 is electrically and thermally insulated, by a refractory packing 24, from an outer plate 25 which forms the back of the screen and faces the glass sheet during its drawing. Side plates 25a are bolted to the outer plate 25 and secured to the outer tubes 23, connecting them to the heating device 19. Refractory packing 24 is employed between plates 25 and 19. The metal plate 19 is provided with slots 26 in order to increase its electrical resistance. By a suitable distribution of these slots the temperature of the plate may be regulated from end to end in order to radiate heat quantities which are different from place to place in the glass sheet, if desired.

Figure 1:
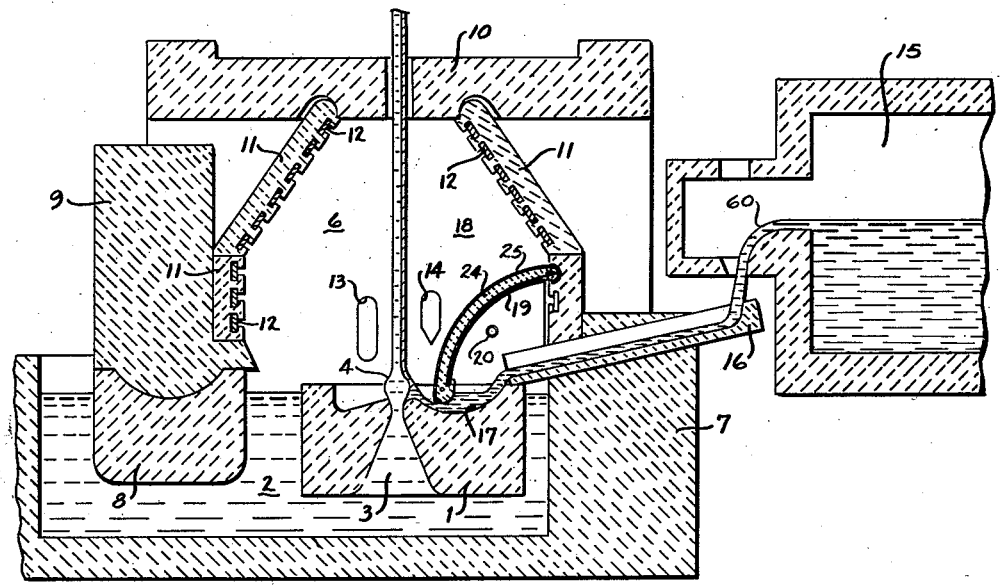
Figure 1 represents the drawing chamber in vertical cross section perpendicular to the plane of the glass sheet.

In the example of Figures 1 and 2, the lower edge of the screen is immersed in the enamel bath 17 so as to raise its level in respect with the level of the drawing slot 3 and to produce a hydrostatic pressure which favours the flowing of enamel onto the base of the glass sheet 5. In this case, the lower edge of the screen is formed by a refractory member 27 fastened to side plates 25a by refractory rod 27a and which is the only piece dipped into the molten enamel 17.

On the contrary, in the example illustrated by Figure 3, the screen is not dipped into the enamel bath, so the bulb 4, which emerges through the drawing slot, is exposed to the radiant heat which passes through the slot 28 between the edge of the screen and the surface of the enamel. To prevent any direct contacting of the glass sheet 5 by the enamel that issues from the spout 16, a transverse weir, made of a movable refractory bar 29 is fastened to the drawing box and forces the enamel to extend itself along the bar and acquire uniform depth before reaching the edge of the sheet, thus insuring its homogeneous distribution along the entire width of the sheet.

The lateral walls of chamber 6, comprised between the screen and the drawing box, are provided with grooves 12 in which electrical resistances are placed (Figure 1).

It is desirable to regulate the slot 28 which emits the thermal radiation, either for bringing it closer to the glass sheet or moving it to a distance therefrom, or for increasing or lessening its width, or for varying said width from one end to the opposite end of the glass sheet. Figures 4 and 5 illustrate, as examples, devices ensuring such regulations.

Two rods 31 are suspended on an axle 30 symmetrically to the middle of the glass sheet; two sleeves 32 fastened to said rods bear the tube 33 which supports the screen. By screwing up or down the rods 31, the height at which the screen is supported can be regulated and, if desired the screen may be tilted on the horizontal plane by differentially screwing the rods 31.

In the same way, by means of two nuts 34 controlling the distance between the sleeves 32 and the fixed points 35, the distance between the screen and the glass sheet can be fixed and, in case of need, the screen can be set obliquely to the axes of the drawing slots.

The lower edge of the screen can be raised or lowered by means of a handwheel 37 integral with a threaded rod 37a acting on a bracket (leg) 36 which is laterally fastened to the tube 33 and rotates it in the sleeves 32. In the same way, a handwheel 39 moves the screen laterally by means of the threaded rod 39a and the bracket 38.

Owing to these regulating members, the lower edge of the screen can be lifted or lowered symmetrically or dissymmetrically with respect to the axis of the drawing slot, or placed parallel or oblique to said slot. In this manner the thermal radiation emitted by the slot 28, which is comprised between the lower edge of the screen and the surface of the enamel, may be directed as precisely as a beam of light on the part of the bulb that one wishes to affect.

The process of electric heating by radiation, according to the invention, enables one to control the temperature very easily, and has no reducing action on enamel, as does heating by flames, which cannot be controlled or accurately directed.

By using a heating plate 19 made of highly refractory steel, the temperature under the screen can easily be brought to 1200° C. while keeping the temperature in the drawing chamber at 600° C., the temperature of casing 25 being not over 800° C.

For the installation and handling, the heating device and cooler 14 which are located on the same side of the glass sheet may be combined into one group; it is enough to form the metal casing 25 of the heating device, or only the part of said casing that fronts the glass sheet, as a jacket in which water circulates and which acts as a cooler.

Referring to Fig. 6 for some constructional details of the screen, the outer shield 25, which is not electrified, forms the outer covering for the refractory non-conductor 24 and the plate 19, which is heated by the passage of current from left connector 20 through plate 19 to right connector 20. The refractory 24 insulates the whole of the electrified plate 19 from contact with screen 25, the end 50 of plate 19 being set in the refractory within a loop 51 formed by the shield 25. At the lower end the refractory, lip member 27 extends over the ends of screen 25 and plate 19 so that only the refractory lip actually need touch the glass or enamel in the trough 17.

In Fig. 7 are shown some details of the electrical connections for plate 19. The wings of plate 19 are welded at 54 to connector tube 20, which is internally cooled by a flow of water from an internal pipe 20' which flows out pipe 20. This cooling system is known and is not part of the present invention. The end walls 21 support the outer shells 23 of the assembly.

It is understood that with very simple adjustments, and within the scope of the invention, said invention can be applied to other manufactures, such as glass tubings or rods obtained by the Fourcault process or other drawing processes.

We claim:

1. An apparatus for the drawing of a composite glass sheet comprising means to draw a glass sheet, means to bring another molten vitreous material, in particular an enamel, on to at least one side of the bulb of the glass sheet, means for controlling the flow of said vitreous material before it reaches the bulb of the glass sheet and means for controlling the temperature of said flow of vitreous material in the neighbourhood of said bulb comprising Joule effect heating means adapted to radiate heat on to a predetermined confined portion of said flow and a shield opposing the radiation of heat in other directions.

2. An apparatus according to claim 1 in which the heating means and the shield are mounted in a single unit.

3. An apparatus according to claim 1 in which the means controlling the vitreous flow comprise a part acting as a barrier to limit the depth of the vitreous flow between it and the supporting member of said vitreous material.

4. An apparatus according to claim 1, having position adjusting means associated with the shield whereby the shield may be regulated with regard to the glass sheet and the vitreous flow.

5. An apparatus for the drawing of a composite glass sheet comprising means for drawing a glass sheet, means to bring a flow of another vitreous material, in particular an enamel, on to at least one side of the bulb of the glass sheet, heating means constituted by an electrical resistance arranged to direct heat over a confined portion of the flow of vitreous material, said heating means being mounted on a member acting as a shield opposing the radiation of heat in other directions.

6. An apparatus according to claim 5, in which the heating means is constituted by an electrically heated conducting plate of a shape adapted to direct heat radiation on the desired part of the vitreous flow.

7. An apparatus according to claim 5, in which the heating means are mounted on a refractory member.

8. An apparatus according to claim 5, in which the unit comprising the heating means and the shield member is heat insulated on its face opposite to that directed towards the vitreous flow.

9. An apparatus for the drawing of a composite glass sheet, means for drawing a glass sheet, means to bring a flow of another vitreous material, in particular an enamel, on to at least one side of the bulb of the glass sheet, means for controlling the temperature of the vitreous flow in the neighbourhood of said bulb comprising radiant heating means adapted to direct heat toward said flow and to provide the desired temperature distribution along the width of the vitreous flow, and shield means provided on the face of the radiant heating means opposite that which is turned towards the vitreous flow acting as a shield to oppose radiation of heat in other directions.

10. An apparatus according to claim 9, in which the heating means is constituted by a resistance plate provided with apertures arranged to insure the desired temperature distribution.

11. An apparatus according to claim 9, in which the heating means and the shield means have in cross section a curved shape, the convexity of which is turned towards the glass sheet.

12. An apparatus according to claim 9, in which the lower edge of the shield means is provided with a part penetrating into the flow of vitreous material and acting as a barrier for controlling its thickness.

13. An apparatus according to claim 9, in which the radiant heating means is provided with position adjusting means whereby it may be regulated with regard to the glass sheet and the vitreous material.

14. An apparatus, according to claim 9, having shield means out of contact with the vitreous flow, and having barrier means for controlling the flow of the vitreous material.

15. Apparatus for the drawing of a composite glass sheet comprising a drawing chamber adapted to contain a drawing pool, walls surrounding the chamber, electric radiator means to heat the pool and the drawn glass at drawing temperature, a drawing float in said chamber having a slot through which a component of the glass sheet is drawn, a basin parallel to the slot, means to supply the basin with another molten component of the glass sheet, said basin being constructed to flow the said second component against the first component to form the composite sheet, electric radiant heating means directed upon the contents of the basin, a shield extending between the radiant heating means and the composite sheet, and universal mounting means for the shield and electric radiant heating means permitting their adjustment for the release of controlled amounts of radiation from the area heated by the radiant heating means toward the drawn sheet.

16. Apparatus for the drawing of a composite glass sheet comprising a drawing chamber, a wall whereof is inclined toward the sheet and provided with grooves containing electrical heating elements for heating the chamber to drawing temperature, a drawing float in said chamber having a slot through which a component of the glass sheet is drawn, a basin in the float parallel to the slot, melting means to supply the basin with another component of the glass sheet, said basin being constructed to flow the said second component onto the bulb of the first component as it issues from the slot, means to distribute the second component evenly along the bulb of the first component, a directional electrical heating element directed upon the contents of the basin, a shield extending between the directional heating element and the composite sheet, and universal mounting means for the shield and directional electrical heating element permitting adjustment of the shield and the controlled release of radiation from the basin to the bulb and the sheet.

17. Apparatus for the drawing of a composite glass sheet comprising a drawing chamber having a pool of glass surrounded by walls, walls thereof being inclined toward the sheet on opposite sides thereof and provided with grooves containing electrical heating elements for heating the chamber to drawing temperature, a drawing float in said chamber having a slot through which a component of the glass sheet is drawn, a basin in the float parallel to the slot, melting means to supply the basin with another component of the glass sheet, said basin being constructed to flow the said second component onto the bulb of the first component as it issues from the slot, means to distribute the second component evenly along the bulb of the first component, a concave electrical heating element directed upon the contents of the basin, a concave shield extending between the concave heating element and the composite sheet, and universal mounting means for the shield and concave electrical heating element permitting adjustment of the shield and the release of radiation from the basin to the sheet.

18. The method of manufacturing elongated composite glass products that comprises drawing a sheet of a first component thereof from a pool of the first component, controlling the temperature of the pool of the first component and of the sheet drawn therefrom, flowing onto the drawn first component adjacent the meniscus a second molten component from a source of supply thereof, and separately controlling the temperature of the second component just before it is applied to the drawn first component.

19. The method of claim 18 wherein the pool is maintained at a first temperature, and the second component is maintained at a second, appreciably higher, temperature.

20. The method of claim 18 wherein the composite glass product is cooled at a location located above the second component.

21. Apparatus for the drawing of a composite glass sheet comprising a drawing chamber containing a drawing block having a drawing slot for a component of the sheet, feeding means for a second component of the sheet comprising a basin in the upper surface of the drawing block, said basin having a delivery lip immediately adjacent one upper edge of the drawing slot, heating means to heat the sheet at one temperature, electric radiant heating means to heat said second component of the sheet in the basin, shield means interposed between the component in the basin and the drawn sheet dividing the drawing chamber into thermally distinct parts, and means to supply a second component to the basin.

References Cited in the file of this patent

UNITED STATES PATENTS

| | | |
|---|---|---|
| 606,792 | Quidas | July 5, 1898 |
| 1,068,907 | Kraeuter et al. | July 29, 1913 |
| 1,489,876 | Whittemore | Apr. 8, 1924 |
| 1,826,006 | Kupferschmid | Oct. 6, 1931 |
| 1,872,699 | Drake | Aug. 23, 1932 |
| 2,131,215 | Bivort | Sept. 27, 1938 |
| 2,691,247 | Henry | Oct. 12, 1954 |

FOREIGN PATENTS

| | | |
|---|---|---|
| 180,518 | Switzerland | Feb. 1, 1936 |
| 552,092 | Germany | June 9, 1932 |
| 576,340 | Germany | May 10, 1933 |
| 589,950 | Great Britain | July 3, 1947 |
| 673,981 | Great Britain | June 18, 1952 |